US010826943B2

(12) United States Patent
Soryal et al.

(10) Patent No.: US 10,826,943 B2
(45) Date of Patent: Nov. 3, 2020

(54) SECURITY CONTROLLER

(71) Applicant: AT&T INTELLECTUAL PROPERTY I, LP., Atlanta, GA (US)

(72) Inventors: Joseph Soryal, Ridgewood, NY (US); Cristina Serban, Middletown, NJ (US); Lalita Rao, Holmdel, NJ (US); Naila Jaoude, Eatontown, NJ (US); Tony Hansen, South Amboy, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 140 days.

(21) Appl. No.: 16/106,596

(22) Filed: Aug. 21, 2018

(65) Prior Publication Data
US 2020/0067983 A1 Feb. 27, 2020

(51) Int. Cl.
*H04L 29/06* (2006.01)
*G06F 21/53* (2013.01)
(Continued)

(52) U.S. Cl.
CPC .......... *H04L 63/20* (2013.01); *G06F 9/45558* (2013.01); *G06F 21/53* (2013.01); *H04L 41/0816* (2013.01); *H04L 41/0866* (2013.01); *G06F 2009/45562* (2013.01); *G06F 2009/45587* (2013.01)

(58) Field of Classification Search
CPC . H04L 63/20; H04L 41/0816; H04L 41/0866; G06F 21/53; G06F 9/45558; G06F 2009/45562; G06F 2009/45587
See application file for complete search history.

(56) References Cited

U.S. PATENT DOCUMENTS

| 8,984,504 B2 | 3/2015 | Backer et al. |
| 9,165,140 B2 | 10/2015 | McGee |

(Continued)

FOREIGN PATENT DOCUMENTS

| WO | 2014118362 A1 | 8/2014 |
| WO | 2016053232 A1 | 4/2016 |

OTHER PUBLICATIONS

Ibrahim, A. S. et al., "CloudSec: A Security Monitoring Appliance for Virtual Machines in the IaaS Cloud Model," 2011 5th International Conference on Network and System Security, Sep. 6-8, 2011, pp. 113-120.

(Continued)

*Primary Examiner* — James R Turchen
(74) *Attorney, Agent, or Firm* — Guntin & Gust, PLC; Robert Gingher

(57) ABSTRACT

In one embodiment, a method includes receiving, by a security controller, a first security sequence generated by a network controller of a network and a second security sequence generated by a node of the network. The second security sequence is a security configuration of the node when the second security sequence was generated. The method also includes generating, by the security controller, a third security sequence and detecting, by the security controller, a discrepancy between the first security sequence, the second security sequence, and the third security sequence. In response to detecting the discrepancy, the method further includes determining, by the security controller, that the security configuration of the node has been modified.

20 Claims, 4 Drawing Sheets

(51) Int. Cl.
*H04L 12/24* (2006.01)
*G06F 9/455* (2018.01)

(56) References Cited

U.S. PATENT DOCUMENTS

| | | | |
|---|---|---|---|
| 9,166,988 | B1 | 10/2015 | Shin et al. |
| 9,389,898 | B2 | 7/2016 | Barak et al. |
| 9,503,475 | B2 | 11/2016 | Fadida et al. |
| 9,571,507 | B2 | 2/2017 | Cooper et al. |
| 9,596,268 | B2 | 3/2017 | Narayanaswamy et al. |
| 9,652,607 | B2 | 5/2017 | Dang et al. |
| 9,698,988 | B2 | 7/2017 | Ye et al. |
| 9,705,923 | B2 | 7/2017 | Banerjee |
| 9,774,612 | B2 | 9/2017 | Brandwine et al. |
| 9,819,690 | B2 | 11/2017 | Yao et al. |
| 9,928,101 | B2 | 3/2018 | Wright et al. |
| 9,935,971 | B2 | 4/2018 | Hamilton, II et al. |
| 10,469,451 | B2* | 11/2019 | Sood ............... H04L 63/0428 |
| 10,757,129 | B2* | 8/2020 | Feng ................. H04L 63/12 |
| 2012/0254993 | A1 | 10/2012 | Sallam |
| 2015/0227411 | A1* | 8/2015 | Yi ..................... G06F 11/3608 714/49 |
| 2016/0094573 | A1* | 3/2016 | Sood ................ H04L 63/1433 713/156 |
| 2016/0112269 | A1* | 4/2016 | Singh ................ H04L 43/065 709/224 |
| 2016/0205116 | A1 | 7/2016 | Sang |
| 2016/0337329 | A1* | 11/2016 | Sood ..................... H04L 9/30 |
| 2016/0366184 | A1 | 12/2016 | Luo et al. |
| 2016/0366185 | A1 | 12/2016 | Lee et al. |
| 2016/0373474 | A1* | 12/2016 | Sood .................. G06F 21/50 |
| 2017/0046211 | A1* | 2/2017 | Jayawardena ...... G06F 9/45512 |
| 2017/0180209 | A1* | 6/2017 | Shevenell ........... G06F 9/468 |
| 2017/0214694 | A1 | 7/2017 | Yan |
| 2017/0214707 | A1* | 7/2017 | Grubel ............... G06F 11/301 |
| 2017/0222878 | A1* | 8/2017 | Jacquin ............. H04L 41/0893 |
| 2017/0223530 | A1* | 8/2017 | Marquardt ........... H04L 67/14 |
| 2017/0272437 | A1* | 9/2017 | Balmakhtar ....... H04L 63/0236 |
| 2017/0300696 | A1* | 10/2017 | Qin ..................... G06F 21/57 |
| 2018/0004938 | A1 | 1/2018 | Schilling et al. |
| 2018/0026992 | A1* | 1/2018 | Paczkowski .......... H04L 63/123 726/4 |
| 2018/0034801 | A1* | 2/2018 | Nakano .............. H04L 9/321 |
| 2018/0063184 | A1* | 3/2018 | Feng ................. H04L 63/1433 |
| 2018/0083984 | A1 | 3/2018 | Frost et al. |
| 2018/0212824 | A1* | 7/2018 | Attak ............... H04L 41/0853 |
| 2018/0331909 | A1* | 11/2018 | Zhang .............. H04L 41/0681 |
| 2018/0337931 | A1* | 11/2018 | Hermoni ............. G06F 16/955 |
| 2019/0104022 | A1* | 4/2019 | Power .............. H04L 41/0896 |
| 2019/0245830 | A1* | 8/2019 | Ratnasingham ....... H04L 63/20 |

OTHER PUBLICATIONS

Pfoh, J. et al., "A Formal Model for Virtual Machine Introspection," VMSeo '09, Proceeding of the 1st ACM workshop on Virtual Machine Security, Nov. 9, 2009, pp. 1-9.

Wu, H. et al., "Network Security for Virtual Machine in Cloud Computing," 5th International Conference on Computer Sciences and Convergence Information Technology, Nov. 30-Dec. 2, 2010, pp. 16-21.

Wei, J. et al., "Managing Security of Virtual Machine Images in a Cloud Environment," CCSW '09, Proceedings of the 2009 ACM Workshop on Cloud Computing Security, Nov. 13, 2009, pp. 91-96.

Garfinkel, T. et al., "When Virtual is Herder than Real: Security Challenges in Virtual Machine Based Computing Environments," HOTOS'05 Proceedings of the 10th conference on Hot Topics in Operating Systems, vol. 10, Jun. 12-15, 2005, 6 pages.

Reuben, J. S., "A Survey on Virtual Machine Security," www.cs.umd.edu/class/fall2017/cmso414/readings/vm-security.pdf, downloaded Aug. 13, 2018, 5 pages.

Khan, A., "Virtual Machine Security," Int. J. Information and Computer Security, vol. 9, Nos. 1/2, 2017, pp. 49-84.

* cited by examiner

SECURITY CONTROLLER

TECHNICAL FIELD

This disclosure generally relates to a controller, and more specifically to a security controller.

BACKGROUND

In certain networks, such as networks that utilize software-defined networking (SDN) technology, a controller is responsible for creating network nodes in accordance with specific security configurations. These security configurations determine which operations the created network node can perform. Malicious actors may attempt to modify the security configurations of the created network nodes to enable some form of attack on the network (e.g., enabling unauthorized ports for traffic sniffing).

SUMMARY

According to an embodiment, a method includes receiving, by a security controller, a first security sequence generated by a network controller of a network and a second security sequence generated by a node of the network. The second security sequence is a security configuration of the node when the second security sequence was generated. The method also includes generating, by the security controller, a third security sequence and detecting, by the security controller, a discrepancy between the first security sequence, the second security sequence, and the third security sequence. In response to detecting the discrepancy, the method further includes determining, by the security controller, that the security configuration of the node has been modified.

According to another embodiment, a system includes one or more processors and a memory storing instructions that, when executed by the one or more processors, cause the one or more processors to perform operations including receiving, by a security controller, a first security sequence generated by a network controller of a network and a second security sequence generated by a node of the network. The second security sequence is a security configuration of the node when the second security sequence was generated. The operations further include generating, by the security controller, a third security sequence and detecting, by the security controller, a discrepancy between the first security sequence, the second security sequence, and the third security sequence. In response to detecting the discrepancy, the operations further include determining, by the security controller, that the security configuration of the node has been modified.

According to yet another embodiment, one or more computer-readable storage media embody instructions that, when executed by a processor, cause the processor to perform operations including receiving, by a security controller, a first security sequence generated by a network controller of a network and a second security sequence generated by a node of the network. The second security sequence is a security configuration of the node when the second security sequence was generated. The operations further include generating, by the security controller, a third security sequence and detecting, by the security controller, a discrepancy between the first security sequence, the second security sequence, and the third security sequence. In response to detecting the discrepancy, the operations further include determining, by the security controller, that the security configuration of the node has been modified.

Technical advantages of this disclosure may include one or more of the following. This disclosure may provide non-intrusive security monitoring to virtual machines and software-defined elements of a network. Multiple layers of highly secure verification mechanisms, such as requiring keys to generate security sequences and comparing separately created security sequences, may ensure that the security configurations of network elements (e.g., virtual machines) are not tampered or maliciously compromised. The system of this disclosure may provide a universal security monitoring system that is highly configurable and vendor, hardware, and/or operating system neutral such that the system can be used with virtually any cloud-based virtual environment. The computation required for the security monitoring process of this disclosure may be minimal such that the lightweight computation does not significantly impact the performance of the network elements (e.g., virtual machines and SDN elements). The security monitoring method of this disclosure may detect and isolate compromised nodes of a network before the nodes can harm the network.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

In systems such as virtual machine and SDN ecosystems, a controller (e.g., an SDN controller) is responsible for creating nodes (e.g., software-defined elements) in accordance with certain required security parameters and configurations. For example, a network controller, such as a network orchestrator, may be responsible for creating new virtual machines to form each virtual machine with a certain set of security parameters and configurations. Security parameters and configurations may include opened ports, allowed traffic directions, allowed protocols, access privileges, versions of security patches, operating system information, packet types and/or lengths, static routing tables, and the like. These security configurations are used to determine which operations are performed in the virtual machine and SDN ecosystems. Malicious entities may modify the security parameters of one or more virtual machines and/or SDN elements after their creation, which may result in an attack on the network. Network attacks may include enabling unauthorized ports for traffic sniffing, setting software-defined buffer values larger than the physical buffers to cause buffer overflow, enabling data forwarding on a new interface to be transmitted to a hacker, and so on. Embodiments of this disclosure create a security controller node as a separate entity within the network to ensure the integrity of the security configurations for the newly created network elements.

Figure 1:
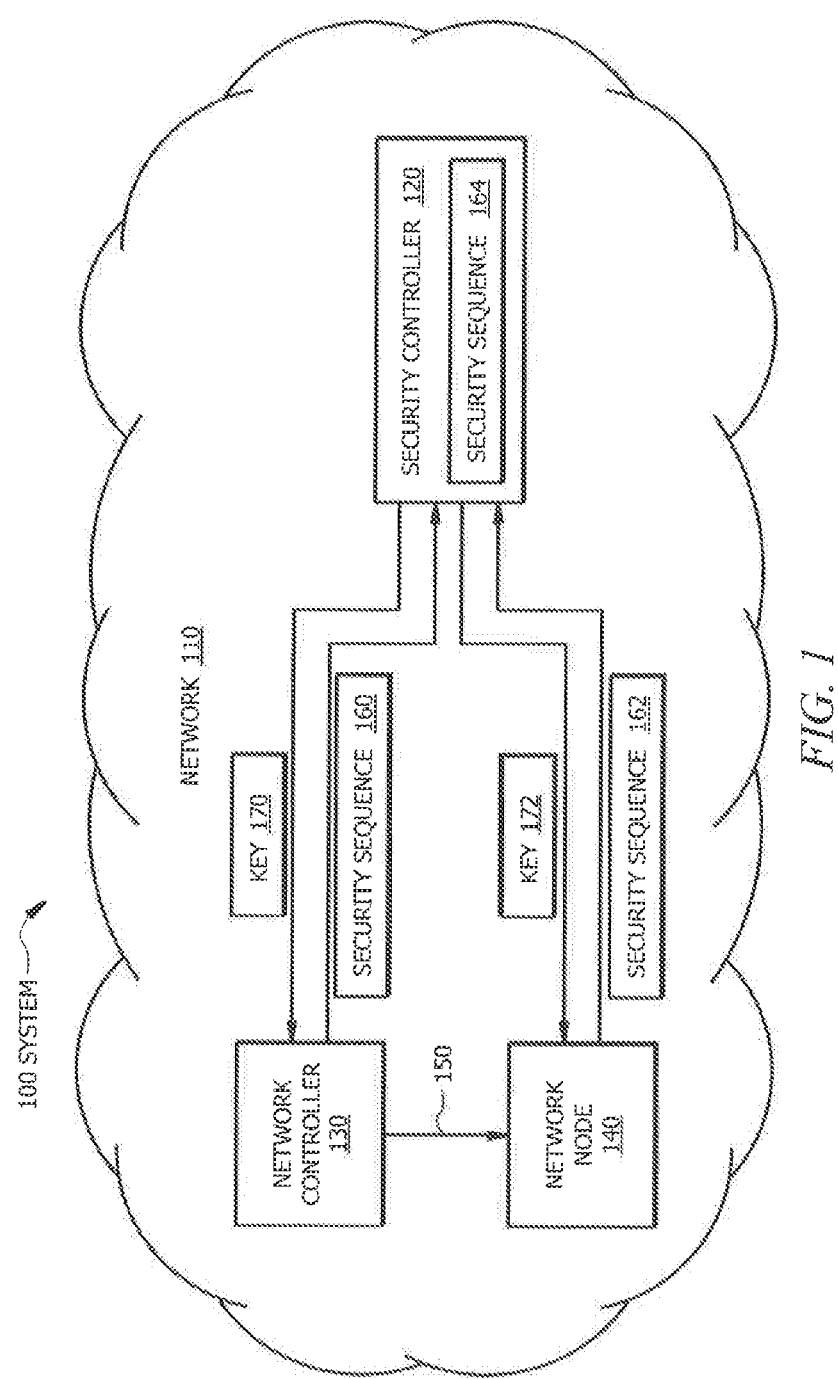
FIG. 1 illustrates an example system for detecting a discrepancy between security sequences.
Figure 2:
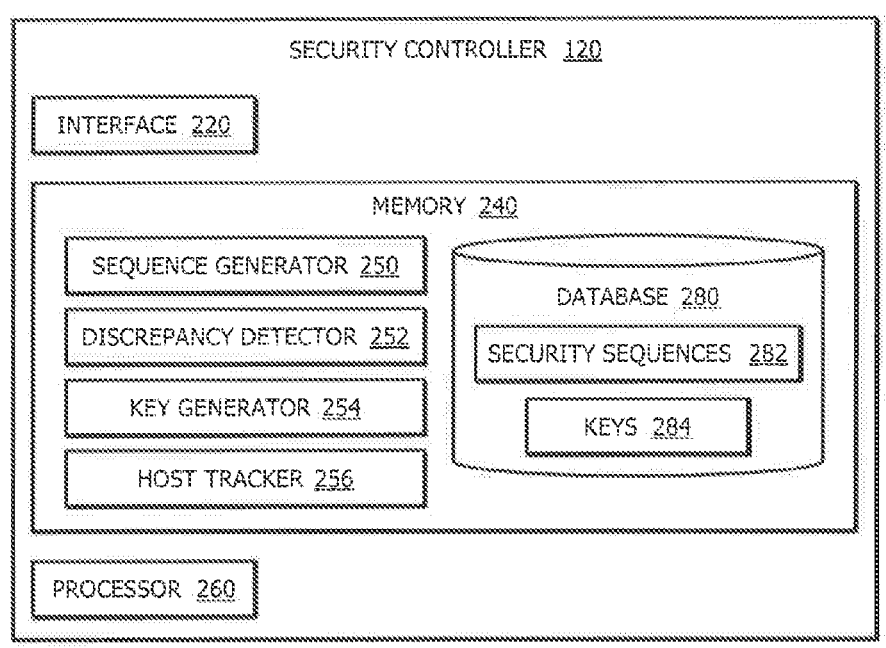
FIG. 2 illustrates an example security controller that may be used by the system of FIG. 1.
Figure 3:
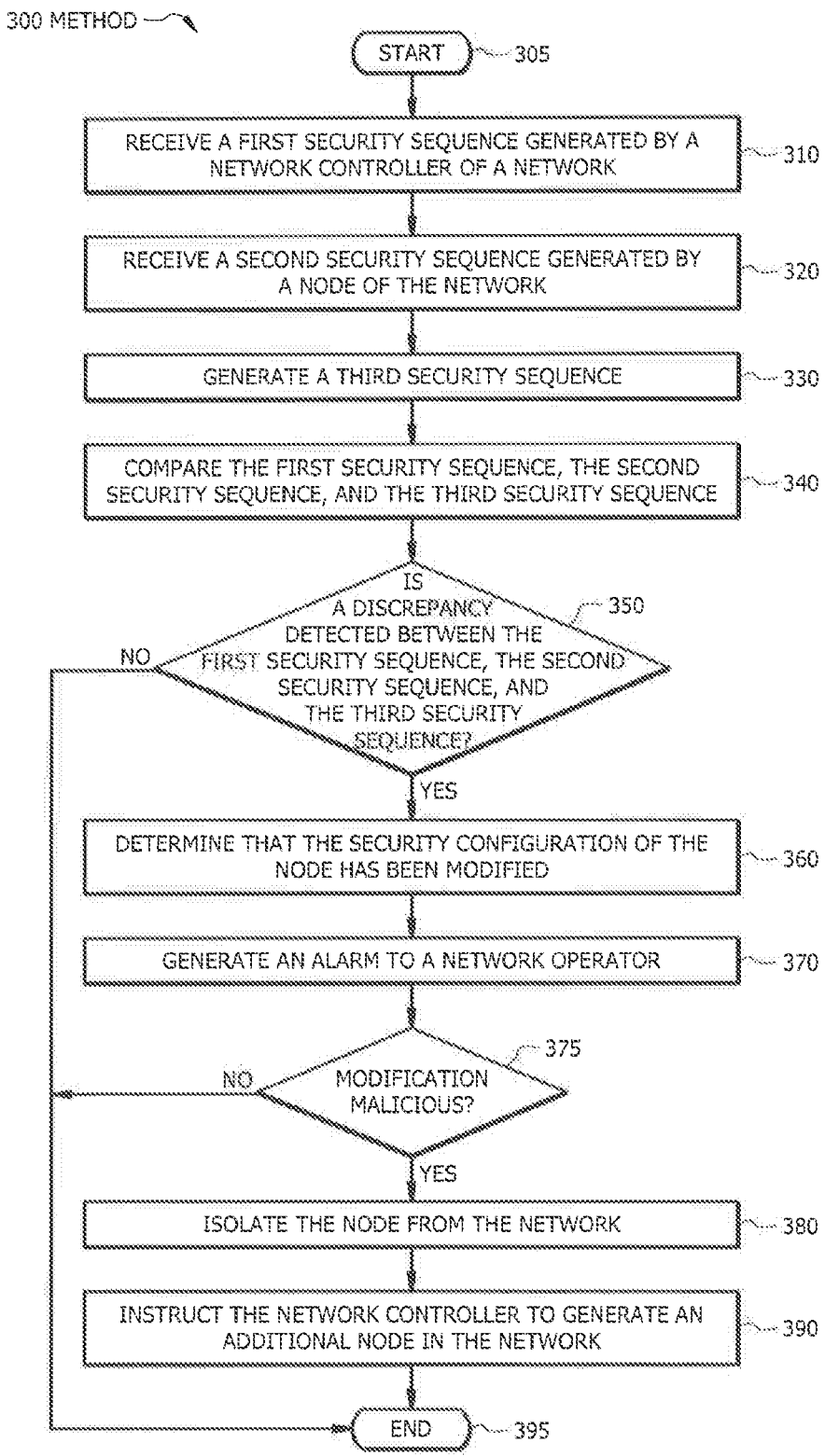
FIG. 3 illustrates an example method for detecting a discrepancy between security sequences that may be used by the system of FIG. 1.
Figure 4:
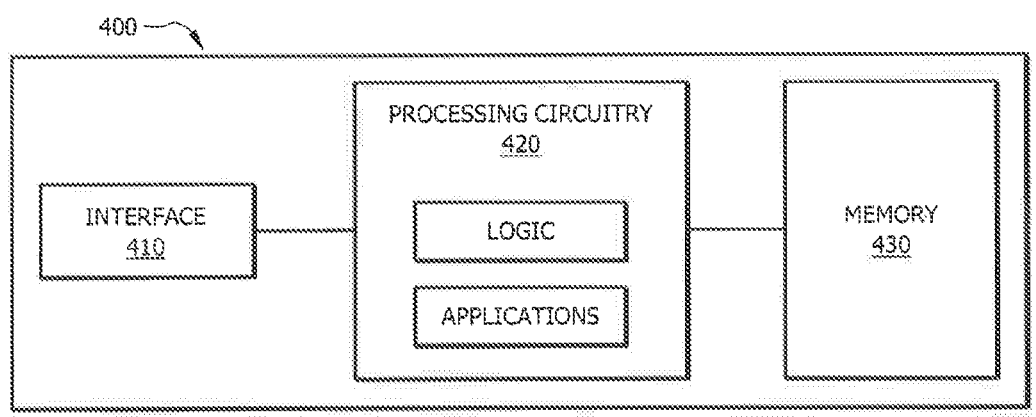
FIG. 4 illustrates an example computer system that may be used by the systems and methods described herein.

FIGS. 1 through 4 show example systems and methods for detecting a discrepancy between security sequences. FIG. 1 shows an example system for detecting a discrepancy between security sequences. FIG. 2 shows an example security controller that may be used by the system of FIG. 1. FIG. 3 shows an example method for detecting a discrepancy between security sequences that may be used by the system of FIG. 1. FIG. 4 shows an example computer system that may be used by the systems and methods described herein.

FIG. 1 illustrates an example system 100 for detecting a discrepancy between security sequences. System 100 of FIG. 1 includes a network 110, a security controller 120, a network controller 130, and a network node 140. One or more components of system 100 may have machine learning capabilities. System 100 or portions thereof may be associated with an entity, which may include any entity, such as a business or company, that detects a discrepancy between security sequences. The elements of system 100 may be implemented using any suitable combination of hardware, firmware, and software.

Network 110 may be any type of network that facilitates communication between components of system 100. Network 110 may connect security controller 120, network controller 130, and network node 140 of system 100. Although this disclosure shows network 110 as being a particular kind of network, this disclosure contemplates any suitable network. One or more portions of network 110 may include SDN technology. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FT network, etc. One or more components of system 100 may communicate over network 110. For example, security controller 120 may communicate over network 110, including receiving information from network controller 130 and network node 140 and transmitting information to network controller 130 and network node 140.

Security controller 120 represents a controller node of network 110 that detects one or more discrepancies between security sequences. Security controller 120 may be created by one or more components of system 100 (e.g., network controller 130) as a separate node in network 110 to ensure the integrity of the security configurations of one or more nodes of network 110. The security configuration for each node may include one or more of the following: a number of opened ports, permitted traffic directions, permitted protocols, access privileges, versions of security patches, operating system information, packet types and lengths, and/or static routing tables. In certain embodiments, the security configuration includes a unique security key.

A security sequence is a checksum (e.g., a long checksum) that is used to detect modifications in security configurations. A checksum is a set of values that is the output of running a checksum algorithm (e.g., a dynamic algorithm). The checksum algorithm will output a different checksum for any change made to the checksum algorithm's input. For example, the checksum algorithm will output a checksum in response to an input of a security configuration of network node 140, and the checksum algorithm will output a different checksum in response to an input of a modified security configuration of network node 140. A security sequence may represent a security configuration of a node of network 110. For example, a security sequence for network node 140 may represent a number of opened ports, permitted traffic directions, permitted protocols, access privileges, versions of security patches, operating system information, packet types and lengths, and/or static routing tables of network node 140. Security sequences of system 100 include security sequence 160 received by security controller 120 from network controller 130, security sequence 162 received by security controller 120 from network node 140, and security sequence 164 generated by security controller 120.

Security controller 120 of network 110 may generate key 170 and transmit key 170 to network controller 130. Security controller 120 may generate key 172 and transmit key 172 to network node 140. Keys 170 and 172 are network security keys, such as passwords or alphanumeric keys, that components of system 100 may use to obtain permission to perform one or more functions. For example, network controller 130 may be required to receive key 170 from security controller 120 prior to generating security sequence 160. As another example, network node 140 may be required to receive key 172 from security controller 120 prior to generating security sequence 162. Security sequence 162 generated by network node 140 may include key 172 in the sequence. Keys 170 and 172 may be utilized by system 100 to ensure that an unauthorized entity cannot force system 100 to run the algorithm that generates security sequences 160 and 162. Each key generated by security controller 120 is unique.

Security controller 120 may be the master node of network 110. For example, security controller 120 may control operations of network controller 130 of network 110. An administrator may preconfigure security controller 120 with rules that control the operations of security controller 120. Security controller 120 is described in more detail in FIG. 2 below.

Network controller 130 of system 100 represents a controller node of network 110 that controls one or more behaviors of network 110. Network controller 130 may be an SDN controller that automatically programs the behavior of an SDN network. For example, network controller 130 may be a centralized software-based controller that instructs subordinate nodes (e.g., network node 140) on how to forward network traffic. Network controller 130 may create one or more subordinate nodes (e.g., virtual machines) of network 110. Network controller 130 may decouple physical hardware from an operating system of a physical machine to create the one or more subordinate nodes of network 110. Network controller 130 may create the one or more subordinate noes using elastic expansion (i.e., the expansion of a cluster of nodes). Network controller 130 may create the one or more subordinate nodes on-demand or according to a pre-determined schedule. In the illustrated embodiment, network controller 130 creates (see notation 150) network node 140.

Network controller 130 may generate security sequence 160 using a checksum algorithm. Security sequence 160 represents a security configuration of network node 140.

Network controller 130 may be prohibited from generating security sequence 160 until network controller 130 receives key 170 from security controller 120. Network controller 130 may generate security sequence 160 in response to receiving key 170 from security controller 120. Security sequence 160 may be encoded into a longer sequence that includes key 170. Network controller 130 transmits security sequence 160 to security controller 120.

Network controller 130 may store security configurations for each type of network node 140 that may be generated by network controller 130. For example, network controller 130 may include a database that stores a security configuration for each of a certain number of potential network nodes, including network node 140, for network 110. An administrator (e.g., a human or a machine) may input the security configurations for each network node into a database of network controller 130.

Network controller 130 may transmit the security configurations for the network nodes stored in the database of network controller 130 to security controller 120. Security controller 120 may query the database of network controller 130 periodically (e.g., every minute, hour, day, or month) for the security configurations.

Network controller 130 may use the security configuration associated with a network node to generate a security sequence for that particular network node. For example, network controller 130 may generate security sequence 160 for network node 140 based on the security configuration for network node 140. Network controller 130 may generate security sequence 160 before, during, or after creating network node 140. Network controller 130 may run a dynamic algorithm to generate security sequence 160. Security sequence 160 may be a long checksum.

Network node 140 of system 100 represents a node (e.g., a virtual machine) of network 110 that is created by network controller 130. Network 110 of system 100 may include multiple network nodes 140. Network node 140 may be an SDN-enabled node that relies upon network controller 130 to provide instructions for forwarding network traffic.

Network node 140 may generate security sequence 162 based on the security configuration of network node 140. Security sequence 162 may represent a security configuration of network node 140 at the time when security sequence 162 is generated. Network node 140 may generate security sequence 162 during or after the creation of network node 140. Network node 140 may run a dynamic algorithm to generate security sequence 162. Security sequence 162 may be a long checksum. Security sequence 162 may be encoded into a longer sequence that includes key 172.

Security sequence 162 generated by network node 140 may be identical to security sequence 160 generated by network controller 130 and security sequence 164 generated by security controller 120 in the event the security configuration of network node 140 has not been modified. Network node 140 may be prohibited from generating security sequence 162 until network node 140 receives key 172 from security controller 120. Network node 140 may generate security sequence 162 in response to receiving key 172 from security controller 120. Network node 140 transmits security sequence 162 to security controller 120.

Although FIG. 1 illustrates a particular arrangement of network 110, security controller 120, network controller 130, and network node 140, this disclosure contemplates any suitable arrangement of network 110, security controller 120, network controller 130, and network node 140. Two or more of security controller 120, network controller 130, and network node 140 may be connected to each other directly, bypassing network 110. Two or more of security controller 120, network controller 130, and network node 140 may be physically or logically co-located with each other in whole or in part. Although FIG. 1 illustrates a particular number of networks 110, security controllers 120, network controllers 130, and network nodes 140, this disclosure contemplates any suitable number of networks 110, security controllers 120, network controllers 130, and network nodes 140. For example, network 110 may include multiple network nodes 140.

In operation, security controller 120 generates keys 170 and 172. Security controller 120 transmits key 170 to network controller 130. In response to receiving key 170, network controller 130 generates security sequence 160, which represents a security configuration that network controller 130 will use to create network node 140. Network controller 130 transmits security sequence 160 to security controller 120. Network controller 130 then creates (see notation 150) network node 140. Security controller 120 transmits key 172 to newly created network node 140. In response to receiving key 172, network node 140 generates security sequence 162, which represents a security configuration of network node 140 at the time security sequence 162 is generated. Network node 140 transmits security sequence 162 to security controller 120. Security controller 120 stores a security configuration for each type of network node, including network node 140. After receiving security sequence 160 from network controller 130 and security sequence 162 from network node 140, security controller 120 generates security sequence 164 based on the stored security configuration for network node 140. Security controller 120 then compares security sequence 160, security sequence 162, and security sequence 164. Based on the comparison, if security controller 120 detects a discrepancy between security sequence 160, security sequence 162, and security sequence 164, which may be any difference between security sequence 160, security sequence 162, and/or security sequence 164, security controller 120 determines that the security confirmation of network node 140 has been modified. In the event security controller 120 determines that network node 140 has been modified, security controller 120 may generate an alarm to an operator of network 110 and/or isolate network node 140 from network 110.

As such, system 100 of FIG. 1 detects discrepancies between security sequences generated by different components of system 100 to determine whether a network node has been modified, which may indicate that the network node has been maliciously compromised.

FIG. 2 illustrates an example security controller 120 that may be used by the system of FIG. 1. Security controller 120 includes interface 220, memory 240, and processor 260. Memory 240 includes sequence generator 250, discrepancy detector 252, key generator 254, host tracker 256, and database 280. Database 280 includes security sequences 282 and keys 284. Security sequences 282 include security sequence 160, security sequence 162, and security sequence 164 of FIG. 1. Keys 284 include key 170 and key 172 of FIG. 1.

Interface 220 of security controller 120 represents any suitable computer element that can receive information from network 110, transmit information through network 110, perform suitable processing of the information, communicate to other components (e.g., network controller 130 and network node 140) of system 100, or any combination of the preceding. Interface 220 may receive security sequence 160 from network controller 130 via network 110, for example.

Interface 220 may transmit key 172 to network node 140, as another example. Interface 220 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 240 of security controller 120 stores, permanently and/or temporarily, received and transmitted information, as well as system software, control software, other software for security controller 120, and a variety of other information. Memory 240 may store information for execution by processor 260. Memory 240 stores sequence generator 250, discrepancy detector 252, key generator 254, host tracker 256, and database 280. Memory 240 includes any one or a combination of volatile or non-volatile local or remote devices suitable for storing information. Memory 240 may include Random Access Memory (RAM), Read-only Memory (ROM), magnetic storage devices, optical storage devices, or any other suitable information storage device or a combination of these devices. Memory 240 may include any suitable information for use in the operation of security controller 120. Additionally, memory 240 may be a component external to (or may be partially external to) security controller 120. Memory 240 may be located at any location suitable for memory 240 to communicate with security controller 120.

Processor 260 of security controller 120 controls certain operations of security controller 120 by processing information received from interface 220 and memory 240 or otherwise accessed by processor 260. Processor 260 communicatively couples to interface 220 and memory 240. Processor 260 may include any hardware and/or software that operates to control and process information. Processor 260 may be a programmable logic device, a microcontroller, a microprocessor, any suitable processing device, or any suitable combination of the preceding. Additionally, processor 260 may be a component external to security controller 120. Processor 260 may be located in any location suitable for processor 260 to communicate with security controller 120. Processor 260 controls the operation of sequence generator 250, discrepancy detector 252, key generator 254, and host tracker 256.

Sequence generator 250 of security controller 120 is a computer program that generates one or more security sequences 282. Database 280 of security controller 120 may store security configurations for each type of network node 140 that may be generated by network controller 130. For example, network controller 130 may transmit a security configuration for each of 100 potential network nodes for network 110, and database 280 of security controller 120 may store these 100 security configurations for the 100 potential network nodes. Each network node has a unique profile even if multiple network nodes share the same functionalities. The unique profile may be obtained from a network node creation template stored in a memory of network controller 130. Sequence generator 250 may generate security sequence 164 of FIG. 1 based on the security configuration stored in database 280 for potential network node 140. Sequence generator 250 may generate security sequence 164 after security controller 120 receives security sequence 162 from network node 140. Sequence generator 250 may run a dynamic algorithm to generate security sequence 164. Security sequence 164 may be a long checksum.

Discrepancy detector 252 of security controller 120 is a computer program that detects discrepancies between one or more security sequences 282 received and/or generated by security controller 120. Discrepancy detector 252 may compare security sequence 160 generated by network controller 130, security sequence 162 generated by network node 140, and security sequence 164 generated by security controller 120 for differences. Each of security sequence 160, security sequence 162, and security sequence 164 may be a long checksum representing one or more of the following: a number of opened ports, permitted traffic directions, permitted protocols, access privileges, versions of security patches, operating system information, packet types and lengths, and/or static routing tables. Discrepancy detector 252 may compare security sequences 160, 162, and 164 periodically (e.g., every minute, hour, day, or month) to ensure the integrity of the security configuration of network node 140.

Discrepancy detector 252 may determine, based on the comparison, whether any discrepancies are detected between security sequence 160, security sequence 162, and security sequence 164. A discrepancy may include any difference between security sequence 160, security sequence 162, and/or security sequence 164. A discrepancy may occur due to malicious activity. For example, a malicious actor may modify the security configuration of network node 140 after its creation to enable unauthorized ports for traffic sniffing, to set software-defined buffer values larger than the physical buffers to cause buffer overflow, and/or to enable data forwarding on a new interface to be sent to a hacker. As another example, the malicious actor may modify the security configurations stored in network controller 130 (e.g., the security configuration used to create network node 140) such that network controller 130 spins up network nodes that contain vulnerabilities.

The discrepancy detected by discrepancy detector 252 may indicate that security sequence 162 received from network node 140 is different from security sequence 160 received from network controller 130 and/or security sequence 164 generated by sequence generator 250 of security controller 120. Since the resultant checksum string of each security sequence changes with the slightest change in the security configuration, security sequence 162 received from network node 140 will change in the event the security configuration of network node 140 is modified.

If discrepancy detector 252 detects a discrepancy between security sequence 160, security sequence 162, and security sequence 164, discrepancy detector 252 determines that the security configuration of network node 140 has been modified. Discrepancy detector 252 may generate an alarm to an operator of network 110 in response to the determined modification of the security configuration of network node 140. The operator of network 110 may perform a manual check of the modified security configuration of network node 140 to determine whether the security configuration changes are bona fide changes (e.g., changes implemented or approved by the operator of network 110) or whether the security configuration changes are caused by malicious activity (e.g., a malicious actor hacking into network controller 130 and changing the security configurations to spin up network nodes similar to network node 140 that contain vulnerabilities).

Discrepancy detector 252 may configure one or more modules (e.g., a blank module) for each network node 140 or system 100. For example, discrepancy detector 252 may configure a module for system 100 by adding additional rules to the module. The additional rules may include rules governing how many network nodes 140 can be created by network controller 130 with the same functionalities in response to an increase in demand, rules governing alerts when a network node is torn down, rules for generating an alarm in response to a predetermined volume of traffic (e.g., 10 login requests per second) crossing a predetermined threshold to check for a denial-of-service attacks, rules for reporting when an administrator with access privileges logs into network node 140, and the like. The rules module may be a machine learning module that automatically adds, deletes, and/or modifies one or more rules.

Discrepancy detector 252 may isolate (e.g., shut down operation of) one or more network nodes of network 110 depending on an acceptable risk level of continuing operation of the one or more network nodes. For example, discrepancy detector 252 may isolate network node 140 from network 110 in response to the determined modification of the security configuration of network node 140. As another example, discrepancy detector 252 may isolate network node 140 from network 110 in response to determining that network node 140 experienced a denial-of-service attack. Isolating network node 140 from network 110 may include shutting down the entire operation of network node 140 and/or restricting operation of network node 140 (e.g., restricting network node 140 from transmitting and receiving traffic).

Network 110 may be a sectionalized model such that multiple (e.g., 10, 50, or 100) nodes operate together as a cluster. In the event the security configuration of one or more of the cluster nodes are modified (e.g., attacked), discrepancy detector 252 may isolate all nodes belonging to the compromised cluster. Discrepancy detector 252 may instruct network controller 130 to generate one or more additional nodes in network 110 to replace one or more of the isolated nodes. For example, discrepancy detector 252 may instruct network controller 130 to replace all isolated cluster nodes. As another example, discrepancy detector 252 may instruct network controller 130 to only replace the cluster nodes with modified security configurations.

Discrepancy detector 252 may collect statistics regarding the modified security configurations and generate security configuration reports. The security configuration reports may specify the discrepancies detected by discrepancy detector 252. The security configuration reports may be exported to a readable format for security personnel reviews. One or more software modules of system 100 may use the security configuration reports to look for patterns (e.g., type of network nodes, allowed protocols, opened ports, etc.) within the modified security configurations.

Key generator 254 of security controller 120 is a computer program that generates keys 284. The algorithm that generates security sequence 160 for network controller 130 may require key 170 to run the algorithm and generate security sequence 160 to ensure that an unauthorized entity cannot force system 100 of FIG. 1 to run the algorithm. Similarly, the algorithm that generates security sequence 162 for network node 140 may require key 172 to run the algorithm and generate security sequence 162 to ensure that an unauthorized entity cannot force system 100 of FIG. 1 to run the algorithm. Using a different, unique key to run each security sequence ensures that each generated security sequence is different, which increases the security of system 100. Key generator 254 may randomly and periodically generate keys (e.g., keys 170 and 172) and distribute them directly to network controller 130 and/or network node 140. In certain embodiments, network controller 130 may pass one or more keys to network node 140 as part of creating network node 140. In certain embodiments, key generator 254 may distribute key 172 to network node 140 as part of the spinning up process of network node 140 to run the security sequence algorithm before network node 140 begins operation. Key generator 254 may be located external to security controller 120, network controller 130, and network node 140. For example, key generator 254 may be located on a different node of network 110.

Host tracker 256 of security controller 120 is a computer program that tracks hosts of network node 140. Network node 140 (e.g., a virtual machine) may reside on a specific host (e.g., a hardware platform) and may later be moved to another host. Host tracker 256 tracks and logs the events each time network node 140 moves to a different host. Network node 140 may perform a security configuration check each time network node 140 is moved to another host and send the results to host tracker 256 to verify that the security configurations are maintained. In the event host tracker 256 does not receive the results of the security configuration check from network node 140, host tracker 256 may generate an alarm. Host tracker 256 may perform the tracking by capturing the host fingerprint (e.g., hardware type, OpenStack version and installation dates, memory, central processing unit (CPU), number of ports, network interface cards types and quantities, and/or machine names).

Database 280 is any component that can store data associated with system 100. Database 280 may store certain types of information for network 110. Database 280 may be a single database or may include multiple databases. Database 280 stores security sequences 282 and keys 284. Database 280 includes any one or a combination of volatile or non-volatile local or remote devices suitable for storing information. Database 280 may include RAM, ROM, magnetic storage devices, optical storage devices, or any other suitable information storage device or a combination of these devices. Although database 280 is shown separate from network controller 130 and network node 140 of FIG. 1, database 280 may be located in any location suitable for communication with network controller 130 and network node 140. Database 280 may be externally located from system 100. Database 280 may be located in network controller 130 and/or network node 140. Although described as a database, database 280 may be implemented as any suitable type of volatile or non-volatile memory. Database 280 may include one or more interfaces and/or processors.

FIG. 3 shows an example method for detecting a discrepancy between security sequences that may be used by the system of FIG. 1. Method 300 begins at step 305. At step 310, security controller 120 of FIG. 1 receives a first security sequence (i.e., security sequence 160 of FIG. 1) generated by network controller 130 of network 110 (e.g., an SDN network). Network controller 130 may generate security sequence 160 after receiving key 170 from security controller 120.

At step 320, security controller 120 of FIG. 1 receives a second security sequence (i.e., security sequence 162 of FIG. 1) generated by network node 140 (e.g., a virtual machine) of network 110. Network node 140 may generate security sequence 162 within a predetermined amount of time after network node 140 is created by network controller 130. Network node 140 may generate security sequence 162 after receiving key 172 from security controller 120. Security sequence 162 may represent a security configuration of network node 140 at a time when security sequence 162 is generated.

At step 330, security controller 120 generates a third security sequence (i.e., security sequence 164 of FIG. 1). Prior to receiving security sequence 162 from network node 140, security controller 120 stores a security configuration that network controller 130 uses to create network node 140. Security controller 120 generates security sequence 164 based on this stored security configuration.

At step 340, security controller 120 compares security sequence 160 generated by network controller 130, security sequence 162 generated by network node 140, and security sequence 164 generated by security controller 120 for differences. Each of security sequence 160, security sequence 162, and security sequence 164 may be a checksum generated by a dynamic algorithm that represents one or more of the following: a number of opened ports, permitted traffic directions, permitted protocols, access privileges, versions of security patches, operating system information, packet types and lengths, and/or static routing tables. At step 350, security controller 120 determines, based on the comparison, whether any discrepancies are detected between security sequence 160, security sequence 162, and security sequence 164. A discrepancy may be any difference between security sequence 160, security sequence 162, and/or security sequence 164. If no discrepancies are detected, method 300 advances to step 395, where method 300 ends. If discrepancies are detected, method 300 moves to step 360, where security controller 120 determines that the security configuration of network node 140 has been modified.

At step 370, security controller 120 generates an alarm to an operator of network 110. The operator may be a human or machine that investigates the determined modification of the security configuration of network node 140 and determines whether the modification is malicious at step 375. The operator may determine that the changes to the security configuration of network node 140 are bona fide changes. For example, a machine learning module of system 100 may determine, from searching the Internet, that network node 140 requires a router to allow certain functionality. The machine learning module may create the router for network node 140, and the operator may determine that the security configuration change of network node 140 due to the newly created router is a bona fide change. Alternatively, the operator may determine that the changes to the security configuration of network node 140 are due to malicious activity. For example, a malicious actor may modify the security configuration of network node 140 to enable unauthorized ports for traffic sniffing, and the operator may determine that the unauthorized security configuration change is an attack on network node 140.

At step 380, security controller 120 isolates network node 140 from network 110. Isolating network node 140 from network 110 may include shutting down the operation of network node 140 or restricting the operation of network node 140. At step 390, security controller 120 instructs network controller 130 to generate one or more additional nodes in network 110 to replace isolated network node 140. Method 300 then moves to step 395, where method 300 ends.

Modifications, additions, or omissions may be made to method 300 depicted in FIG. 3. Method 300 may include more, fewer, or other steps. For example, method 300 may include creating, by network controller 130 of network 110, security controller 120. As another example, method 300 may require approval from the operator of network 110 prior to advancing from step 375 (i.e., determining whether a modification is malicious) to step 380 (i.e., isolating network node 140 from network 110). As still another example, method 300 may perform step 380 prior to performing step 370 in the event network node 140 is experiencing heavy traffic (e.g., 200 login requests in one day as compared to an average of 20 login requests per day). Steps may also be performed in parallel or in any suitable order. While discussed as specific components completing the steps of method 300, any suitable component of system 100 may perform any step of method 300.

FIG. 4 shows an example computer system that may be used by the systems and methods described herein. For example, any of network 110, security controller 120, network controller 130, and network node 140 of FIG. 1 may include one or more interface(s) 410, processing circuitry 420, memory(ies) 430, and/or other suitable element(s). Interface 410 (e.g., interface 220 of FIG. 2) receives input, sends output, processes the input and/or output, and/or performs other suitable operation. Interface 410 may comprise hardware and/or software.

Processing circuitry 420 (e.g., processor 260 of FIG. 2) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 240 of FIG. 2) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   receiving, by a security controller, a first security sequence generated by a network controller of a network and a second security sequence generated by a node of the network, wherein the second security sequence is a security configuration of the node when the second security sequence was generated;
   generating, by the security controller, a third security sequence;
   detecting, by the security controller, a discrepancy by comparing the first security sequence, the second security sequence, and the third security sequence; and
   in response to detecting the discrepancy, determining, by the security controller, that the security configuration of the node has been modified.

2. The method of claim 1, further comprising, in response to determining that the security configuration of the node has been modified:
   generating, by the security controller, an alarm to an operator of the network;
   isolating, by the security controller, the node from the network; and
   instructing, by the security controller, the network controller to generate an additional node in the network.

3. The method of claim 1, further comprising:
   storing, by the security controller and prior to receiving the second security sequence from the node of the network, a second security configuration of the node, wherein the node is a virtual machine and the network is a software defined network (SDN); and
   generating, by the security controller, the third security sequence based on the second security configuration, wherein the first security sequence, the second security sequence, and the third security sequence are each a checksum generated by a dynamic algorithm.

4. The method of claim 1, wherein the second security sequence is generated in response to a creation of the node.

5. The method of claim 1, further comprising:
   tracking, by the security controller, a first host of the node; and
   logging, by the security controller, an event, the event comprising the node being moved from the first host to a second host;
   wherein:
      the first host is a hardware platform on which the node resides; and
      tracking the first host comprises capturing a fingerprint of the first host.

6. The method of claim 1, further comprising receiving, by the security controller, a dynamic key, wherein generating the third security sequence requires the dynamic key.

7. The method of claim 1, wherein the security configuration comprises one or more of the following:
   a number of opened ports;
   permitted traffic directions;
   permitted protocols;
   access privileges;
   versions of security patches;
   operating system specifics;
   packet types and lengths; and
   static routing tables.

8. A system comprising one or more processors and a memory storing instructions that, when executed by the one or more processors, cause the one or more processors to perform operations comprising:
   receiving, by a security controller, a first security sequence generated by a network controller of a network and a second security sequence generated by a node of the network, wherein the second security sequence is a security configuration of the node when the second security sequence was generated;
   generating, by the security controller, a third security sequence;
   detecting, by the security controller, a discrepancy by comparing the first security sequence, the second security sequence, and the third security sequence; and
   in response to detecting the discrepancy, determining, by the security controller, that the security configuration of the node has been modified.

9. The system of claim 8, wherein the operations further comprise, in response to determining that the security configuration of the node has been modified:
   generating, by the security controller, an alarm to an operator of the network;
   isolating, by the security controller, the node from the network; and
   instructing, by the security controller, the network controller to generate an additional node in the network.

10. The system of claim 8, wherein the operations further comprise:
    storing, by the security controller and prior to receiving the second security sequence from the node of the network, a second security configuration of the node, wherein the node is a virtual machine and the network is a software defined network (SDN); and
    generating, by the security controller, the third security sequence based on the second security configuration, wherein the first security sequence, the second security sequence, and the third security sequence are each a checksum generated by a dynamic algorithm.

11. The system of claim 8, wherein the second security sequence is generated in response to a creation of the node.

12. The system of claim 8, wherein the operations further comprise:
    tracking, by the security controller, a first host of the node; and logging, by the security controller, an event, the event comprising the node being moved from the first host to a second host;
wherein:
the first host is a hardware platform on which the node resides; and
tracking the first host comprises capturing a fingerprint of the first host.

13. The system of claim 8, wherein the operations further comprise receiving, by the security controller, a dynamic key, wherein generating the third security sequence requires the dynamic key.

14. The system of claim 8, wherein the security configuration comprises one or more of the following:
a number of opened ports;
permitted traffic directions;
permitted protocols;
access privileges;
versions of security patches;
operating system specifics;
packet types and lengths; and
static routing tables.

15. One or more non-transitory computer-readable storage media embodying instructions that, when executed by a processor, cause the processor to perform operations comprising:
receiving, by a security controller, a first security sequence generated by a network controller of a network and a second security sequence generated by a node of the network, wherein the second security sequence is a security configuration of the node when the second security sequence was generated;
generating, by the security controller, a third security sequence;
detecting, by the security controller, a discrepancy by comparing the first security sequence, the second security sequence, and the third security sequence; and
in response to detecting the discrepancy, determining, by the security controller, that the security configuration of the node has been modified.

16. The one or more non-transitory computer-readable storage media of claim 15, wherein the operations further comprise, in response to determining that the security configuration of the node has been modified:
generating, by the security controller, an alarm to an operator of the network;
isolating, by the security controller, the node from the network; and
instructing, by the security controller, the network controller to generate an additional node in the network.

17. The one or more non-transitory computer-readable storage media of claim 15, wherein the operations further comprise:
storing, by the security controller and prior to receiving the second security sequence from the node of the network, a second security configuration of the node, wherein the node is a virtual machine and the network is a software defined network (SDN); and
generating, by the security controller, the third security sequence based on the second security configuration, wherein the first security sequence, the second security sequence, and the third security sequence are each a checksum generated by a dynamic algorithm.

18. The one or more non-transitory computer-readable storage media of claim 15, wherein the second security sequence is generated in response to a creation of the node.

19. The one or more non-transitory computer-readable storage media of claim 15, wherein the operations further comprise:
tracking, by the security controller, a first host of the node; and
logging, by the security controller, an event, the event comprising the node being moved from the first host to a second host;
wherein:
the first host is a hardware platform on which the node resides; and
tracking the first host comprises capturing a fingerprint of the first host.

20. The one or more non-transitory computer-readable storage media of claim 15, wherein the operations further comprise receiving, by the security controller, a dynamic key, wherein generating the third security sequence requires the dynamic key.

* * * * *